United States Patent
Kim et al.

(10) Patent No.: US 10,866,303 B2
(45) Date of Patent: Dec. 15, 2020

(54) DETERMINING THE LOCATION OF A MOBILE COMPUTING DEVICE

(71) Applicant: Hewlett Packard Enterprise Development LP, Houston, TX (US)

(72) Inventors: Dongho Kim, Palo Alto, CA (US); Souvik Sen, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/691,752

(22) Filed: Nov. 22, 2019

(65) Prior Publication Data

US 2020/0088837 A1    Mar. 19, 2020

Related U.S. Application Data

(63) Continuation of application No. 15/307,884, filed as application No. PCT/US2014/042380 on Jun. 13, 2014, now abandoned.

(51) Int. Cl.
     *H04W 24/00*      (2009.01)
     *G01S 5/14*      (2006.01)
     (Continued)

(52) U.S. Cl.
     CPC .............. *G01S 5/14* (2013.01); *G01S 5/0215* (2013.01); *G01S 5/04* (2013.01); *H04W 64/00* (2013.01)

(58) Field of Classification Search
     CPC . G01S 5/0215; G01S 5/14; G01S 5/22; G01S 5/24; G01S 5/28; G01S 5/30;
(Continued)

(56) References Cited

U.S. PATENT DOCUMENTS

| 8,179,816 B1 | 5/2012 | Vaidyanathan et al. |
| 8,224,401 B1 | 7/2012 | Schlichter |

(Continued)

FOREIGN PATENT DOCUMENTS

| WO | 2011/084063 A1 | 7/2011 |
| WO | 2014/060777 A2 | 4/2014 |

OTHER PUBLICATIONS

Alcock et al., "Poster Abstract: Combining Positioning & Communication Using Ultra Wideband Transceivers", Feb. 2009, 2 pages.
(Continued)

*Primary Examiner* — Huy C Ho
(74) *Attorney, Agent, or Firm* — Fabian VanCott

(57) ABSTRACT

A method of determining the location of a mobile computing device includes measuring a first time of flight (ToF) value and a first value of received energy of direct path (EDP) ($P_R$) of a number of acknowledgement (ACK) packets received in response to a number of first probe packets sent to a first mobile device. The method calculates a preliminary distance value ($d_0$) using a ToF-based distance equation, selects an ACK packet with a distance closest to $d_0$ from the number of ACK packets, calculates an initial path loss exponent ($\gamma_0$) of the selected ACK packet sample using $d_0$ and $P_R$. With the access point, the method also includes measuring a second $P_R$ for a second number of ACK packets received in response to a number of second probe packets sent to the first mobile device, calculates a supplemental distance value using an EDP-based distance equation and the $\gamma_0$, and determines the location of the mobile device using multilateration and the supplemental distance value.

15 Claims, 8 Drawing Sheets

(51) Int. Cl.
*H04W 64/00* (2009.01)
*G01S 5/04* (2006.01)
*G01S 5/02* (2010.01)

(58) Field of Classification Search
CPC ..... G01S 5/04; G01S 5/06; G01S 5/08; G01S 5/10; H04W 64/00; H04W 4/02
USPC ..................................................... 455/456.1
See application file for complete search history.

(56) References Cited

U.S. PATENT DOCUMENTS

| | | | |
|---|---|---|---|
| 8,243,626 B2* | 8/2012 | Hall | H04W 64/00 370/255 |
| 8,848,565 B2* | 9/2014 | Curticapean | G01S 5/12 370/252 |
| 2004/0076136 A1 | 4/2004 | Beach | |
| 2008/0136709 A1 | 6/2008 | Fullerton et al. | |
| 2012/0013468 A1 | 1/2012 | Olah | |
| 2013/0051255 A1* | 2/2013 | Estevez | H04W 64/00 370/252 |
| 2013/0294266 A1* | 11/2013 | Lim | H04W 24/10 370/252 |
| 2014/0056143 A1 | 2/2014 | Hedlund et al. | |
| 2014/0073352 A1 | 3/2014 | Aldana et al. | |
| 2016/0231414 A1 | 8/2016 | Steiner | |

OTHER PUBLICATIONS

Lopes et al, "High Accuracy 3D Indoor Positioning Using Broadband Ultrasonic Signals", IEEE 11th International Conference, 2012, pp. 2008-2014.

Search Report and Written Opinion received for PCT Application No. PCT/US2014/042380, dated Feb. 13, 2015, 13 pages.

Sen et al., "Avoiding Multipath to Revive Inbuilding WiFi Localization", in Proceedings of the 11th Annual International Conference on Mobile Systems, Applications, and Services, 2013, 14 pages.

* cited by examiner

DETERMINING THE LOCATION OF A MOBILE COMPUTING DEVICE

CROSS-REFERENCE TO RELATED APPLICATIONS

This application is a continuation of U.S. patent application Ser. No. 15/307,884, filed on Oct. 31, 2016, which is a U.S. National Stage Application of PCT US2014/042380, filed on Jun. 13, 2014, the entire contents of both is incorporated by reference herein. The Applicant hereby rescinds any disclaimer of claim scope in the parent application or the prosecution history thereof and advises the USPTO that the claims in this application may be broader than any claim in the parent application(s).

BACKGROUND

Indoor localization systems seek to determine the location of a computing device such as a mobile phone within an area such as an office space. Being able to determine the location of a mobile device in such an environment may assist in locating the device as well as an individual using the device, and has potential for application in various location-based services. One component in an indoor localization system is a mechanism that estimates a distance between the mobile device and an access point (AP). Estimated distances between a mobile device and multiple APs may be used to calculate the exact location of the mobile device through a multilateration technique.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Methods, systems, and computer program products are described herein for use in determining the location of mobile devices within an area. In one example, the area is an indoor area such as an office or home. The distance between a mobile device and an access point (AP) is estimated. Estimated distances between a mobile device and multiple APs are used to calculate exact location of the mobile device by a multilateration technique. The present systems and methods utilize a combination of time-of-flight (ToF) and energy of direct path (EDP) processes to obtain scalable distance estimations. The systems and methods described herein take advantage of a ToF technique's lack of dependency on the characteristics of wireless medium and the scalability of an EDP technique. Thus, the systems and methods described herein reduce or eliminate noise and lack of scalability in a ToF technique as well as lack of accuracy in the EDP technique.

As used in the present specification and in the appended claims, the terms "scalable," "scalability," or similar language are meant to be understood broadly as the ability of a system, network, or process to handle a growing amount of work in a capable manner, or its ability to be enlarged to accommodate that growth. In the context, of the present application, scalability may include the ability of a processing device In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
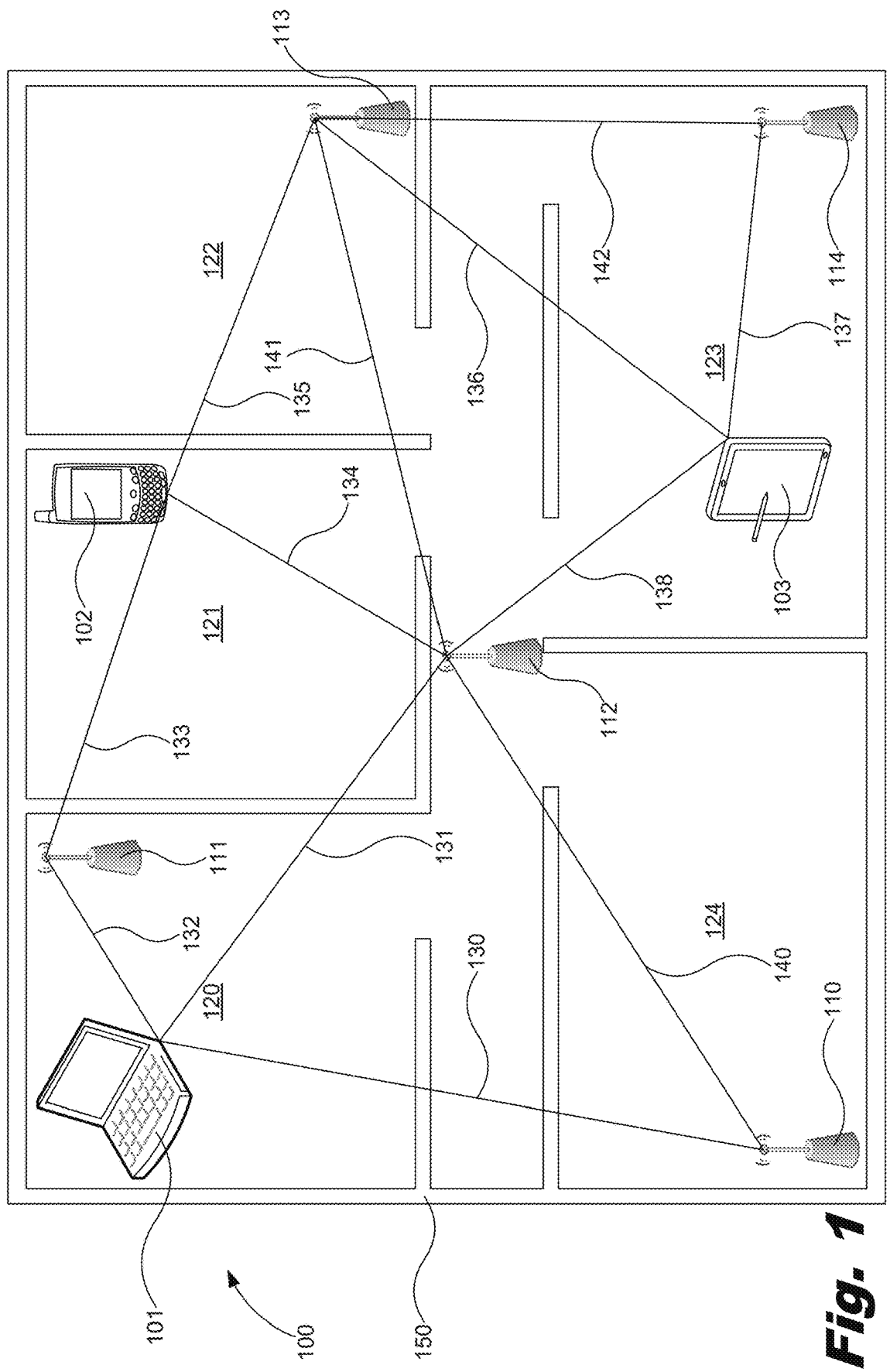
FIG. 1 is a schematic depiction of a localization system in within an indoor environment, according to one example of the principles described herein.

FIG. 1 is a schematic depiction of a localization system (100) in within an indoor environment (150), according to one example of the principles described herein. Although the localization system (100) is depicted as being used within the indoor environment (150), the localization system (100) may be employed in any indoor or outdoor environment in which the location of a mobile device may be determined. Mobile devices (101, 102, 103) may be located within rooms (120, 121, 122, 123, 124) within the indoor environment (150). The mobile devices may be mobile phones (102), laptop computing devices (101), tablet computing devices (103), or other types of mobile computing devices.

The localization system (100) of FIG. 1 may comprise access points (110, 111, 112, 113, 114) that may be distributed throughout the indoor environment (150). In one example, the access points (APs) (110, 111, 112, 113, 114) may be located within the rooms (120, 121, 122, 123, 124) within the indoor environment (150). In another example, the APs (110, 111, 112, 113, 114) may be located within common areas such as hallways, stairwells, and reception areas, for example. The APs (110, 111, 112, 113, 114) may communicate with any of the mobile devices (101, 102, 103) and any of other APs (110, 111, 112, 113, 114).

In determining or estimating a distance between a target mobile device (101, 102, 103) and an AP (110, 111, 112, 113, 114) may measure the time-of-flight (ToF) of probe packets sent to the target mobile device (101, 102, 103). Lines 130, 131, 132, 133, 134, 135, 136, 137, and 138 designate communications between target mobile devices (101, 102, 103) and the APs (110, 111, 112, 113, 114) including the sending of the probe packets and the receiving of acknowledgement (ACK) packets from the mobile devices (101, 102, 103). A ToF-based distance estimation process captures how long it takes a probe packet from a mobile device (101, 102, 103) to arrive at an AP (110, 111, 112, 113, 114). From a ToF measurement, a propagation delay (T) between an AP (110, 111, 112, 113, 114) and a mobile device (101, 102, 103) can be obtained. Consequently, the distance between the mobile device (101, 102, 103) and the AP (110, 111, 112, 113, 114) may be estimated by the following equation:

$$T*c \qquad \text{Eq. 1}$$

where c is the speed of light.

The advantage of a ToF-based distance estimation process is that this process does not depend on the characteristics of the wireless medium in which the probe packets are transmitted since the speed of light does not change depending on the medium. However, ToF-based distance estimation processes and their associated measurements include noise. This is because the detection time of an acknowledgement packet preamble in WiFi is not fixed. Hence, to obtain accuracy in a ToF-based distance estimation process, many samples of ToF measurements need to be collected, and outliers within the captured measurements must be properly removed. This requires an AP (110, 111, 112, 113, 114) to send many probe packets in a given time period. Sending many probe packets in this manner creates a large overhead to the wireless network in which the ToF-based distance estimation process is being used. This overhead limits the number of users that a localization system (100) can support. This also restricts the scalability of the localization system (100), increasing the cost in time and processing resources to determine the location of the mobile devices (101, 102, 103) that exceed an overhead capacity. Thus, an advantage of the localization system (100), as will be described in more detail below, is to provide a distance estimation that is scalable and retains accuracy.

A ToF-based distance estimation process comprises making two measurements: time-of-departure (ToD) and time-of-arrival (ToA). ToD is the time when an AP (110, 111, 112, 113, 114) completes transmission of a probe packet to a mobile device (101, 102, 103). A probe packet may be any type of data packet including a specially designed or purposed probe packet for distance estimation. In a WiFi network, when a mobile device (101, 102, 103) receives a probe packet, the mobile device (101, 102, 103) transmits an acknowledgement (ACK) packet back to the AP (110, 111, 112, 113, 114) within a fixed amount of time called a Short Interframe Space (SIFS). When an AP (110, 111, 112, 113, 114) starts receiving an ACK packet from the mobile device (101, 102, 103), the AP (110, 111, 112, 113, 114) records the time as ToA. ToF is calculated as below.

$$\text{ToF}=(\text{ToA}-\text{ToD}-\text{SIFS})/2 \qquad \text{Eq. 2}$$

Among the three terms in Equation 2, ToD is deterministic since ToD is the completion time of transmitting a packet, and is tightly synchronized with the clock of the AP (110, 111, 112, 113, 114). Further, since reception of a probe packet at the mobile device (101, 102, 103) and response by the mobile device (101, 102, 103) with an ACK packet is implemented in hardware, SIFS is deterministic as well. However, ToA is random since the reception of a probe packet at the mobile device (101, 102, 103) is not synchronized with the clock of the AP (110, 111, 112, 113, 114), and detection of an acknowledgement packet preamble is not deterministic.

Figure 2:
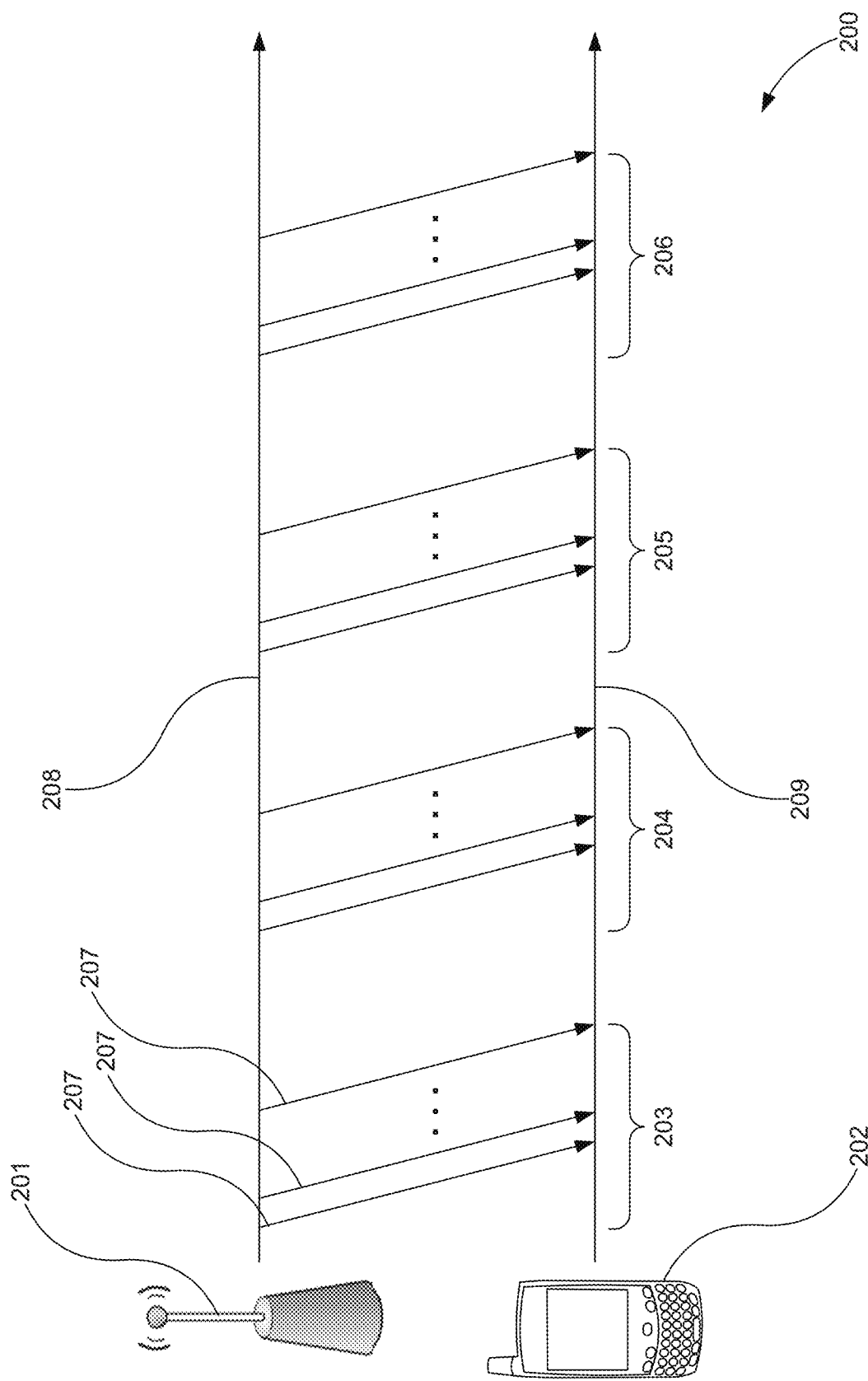
FIG. 2 is a diagram of a timeline of probe packets sent under a time-of-flight (ToF)-based distance estimation process, according to one example of the principles described herein.

One method of obtaining an accurate estimation where the ToA measurements are random is to send many probe packets as depicted in FIG. 2. FIG. 2 is a diagram of a timeline (200) of probe packets (207) sent under a ToF-based distance estimation process, according to one example of the principles described herein. The timeline (200) depicted in FIG. 2 comprises an access point timeline (208) for the AP (201) and a mobile device timeline (209) for the mobile device (202).

In one example, the probe packets (207) sent in a ToF-based distance estimation process is approximately 100 probe packets (207). These probe packets (207) may be sent by the AP (201) to the mobile device (202) as probe packet sets (203, 204, 205, 206), each probe packet set comprising 100 probe packets (207). The ACK packets sent from the mobile device (202) to the AP (201) are not depicted in FIG. 2 for simplicity. However, any number of ACK packets may be sent between any two probe packets (207), between any two probe packet sets (203, 204, 205, 206), or combinations thereof.

As depicted in FIG. 2, the ToF-based distance estimation process collects many samples of ToF measurements. Because these collected samples are independent measurements, the ToF is normally distributed (i.e., via a Gaussian distribution). Because the collected sample measurements do not reflect a heavy-tailed distribution where the probability distribution comprises tails that are not exponentially bounded, outliers outside a range centered at median of the sample measurements may be removed or disregarded. An estimation of a distance between the target mobile device (101, 102, 103) and the (AP (201) is obtained from the ToF measurements with outliers removed or disregarded.

Further, even though obtaining the ToF measurements on the order of approximately 100 measurements from approximately 100 probe packets (207) sent by the AP (201) to the mobile device (202) provides increased accuracy of distance estimation, sending these many probe packets (207) limits the scalability of the localization system (100) significantly. In a WiFi-based localization system, at least three APs (110, 111, 112, 113, 114, 201) send probe packets (207) to a mobile device (101, 102, 103, 202) to perform multilateration. This situation results in an increase in the overhead of probe packets by three times. Further, if an application scenario directs APs (110, 111, 112, 113, 114, 201) to send probe packets (207) frequently due to mobility of the mobile device (101, 102, 103, 202), the overhead of probe packets (207) increases even more.

Figure 3:
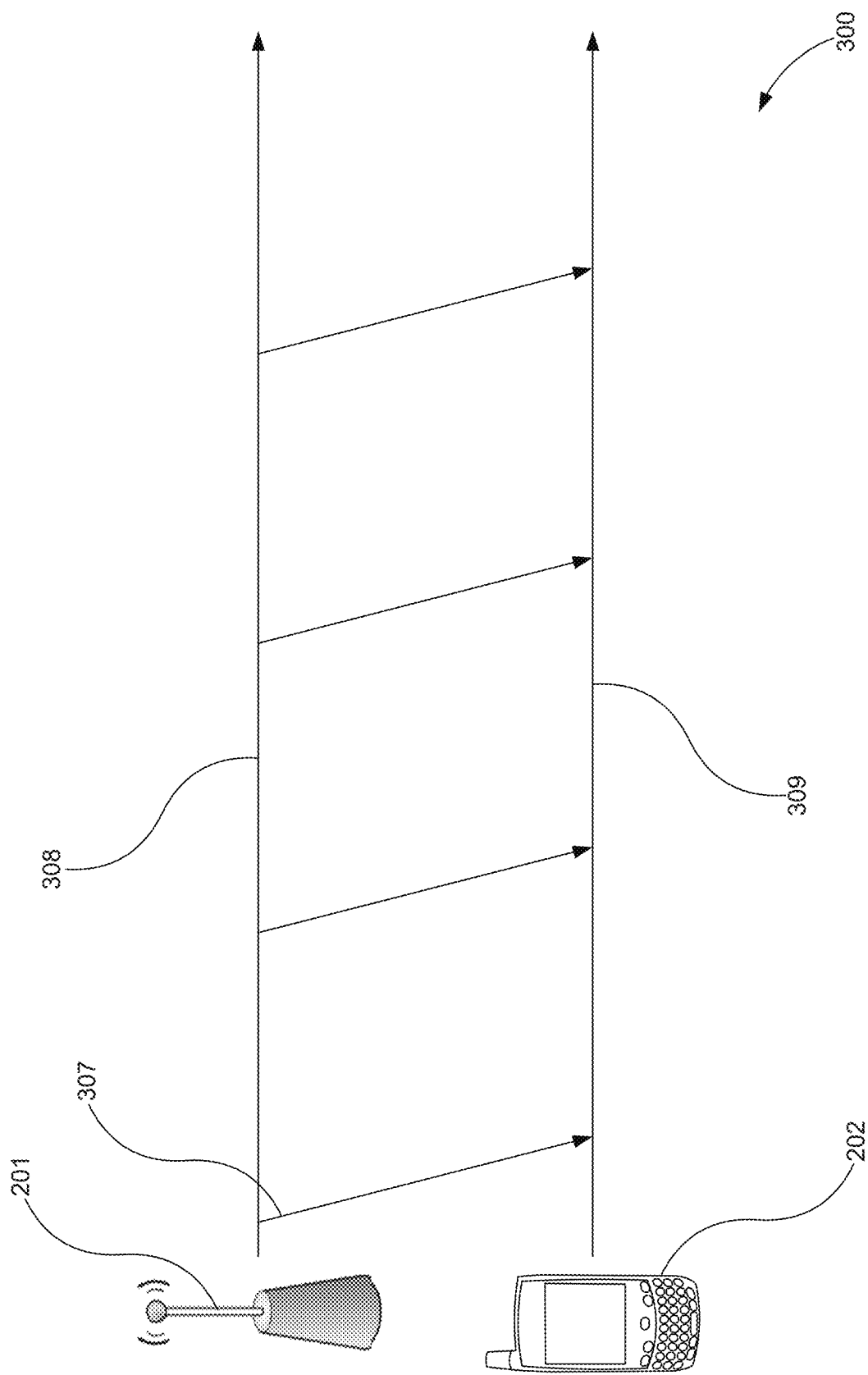
FIG. 3 is a diagram of a timeline of probe packets sent under an energy of direct path (EDP)-based distance estimation process, according to one example of the principles described herein.

Another method of estimating a distance between a mobile device (101, 102, 103, 202) and an AP (110, 111, 112, 113, 114, 201) is to measure the energy of direct path (EDP). In an EDP-based distance estimation process, an AP (110, 111, 112, 113, 114, 201) transmits a probe packet to a mobile device (101, 102, 103, 202), and the mobile device (101, 102, 103, 202) sends back an ACK packet. With the assumption of knowing the received energy ($P_0$) at 1 meter away from a mobile device (101, 102, 103, 202), the distance between the AP (110, 111, 112, 113, 114, 201) and the mobile device (101, 102, 103, 202) may be estimated using the following equation:

$$P_R=P_0-10\gamma \log(d) \qquad \text{Eq. 3}$$

where $P_R$ is received energy of direct path at the AP (110, 111, 112, 113, 114, 201), $\gamma$ is a path loss exponent, and d is the distance between a mobile device (101, 102, 103, 202) and an AP (110, 111, 112, 113, 114, 201). The variance of estimated distance measurements using the EDP-based distance estimation process is minimal. Hence, an EDP-based distance estimation process does not require many samples of EDP measurements as described above in connection with the ToF-based distance estimation process of FIG. 2. FIG. 3 is a diagram of a timeline (300) of probe packets (307) sent under an energy of direct path (EDP)-based distance estimation process, according to one example of the principles described herein. Experiments show that one probe packet (307) is enough for distance estimation using the EDP-based distance estimation process.

While distance estimation using the EDP-based distance estimation process is scalable due to the need to send only one probe packet (307), the accuracy of an EDP-based distance estimation process depends on accurate path loss exponent $\gamma$, which changes over time according to changes in the environment around the mobile device (101, 102, 103, 202) or an AP (110, 111, 112, 113, 114, 201). Prior solutions use an EDP and received signal strength indicator (RSSI), where RSSI contains energy of all signals from multiple paths for $\gamma$. However, this method is also not accurate.

Figure 4:
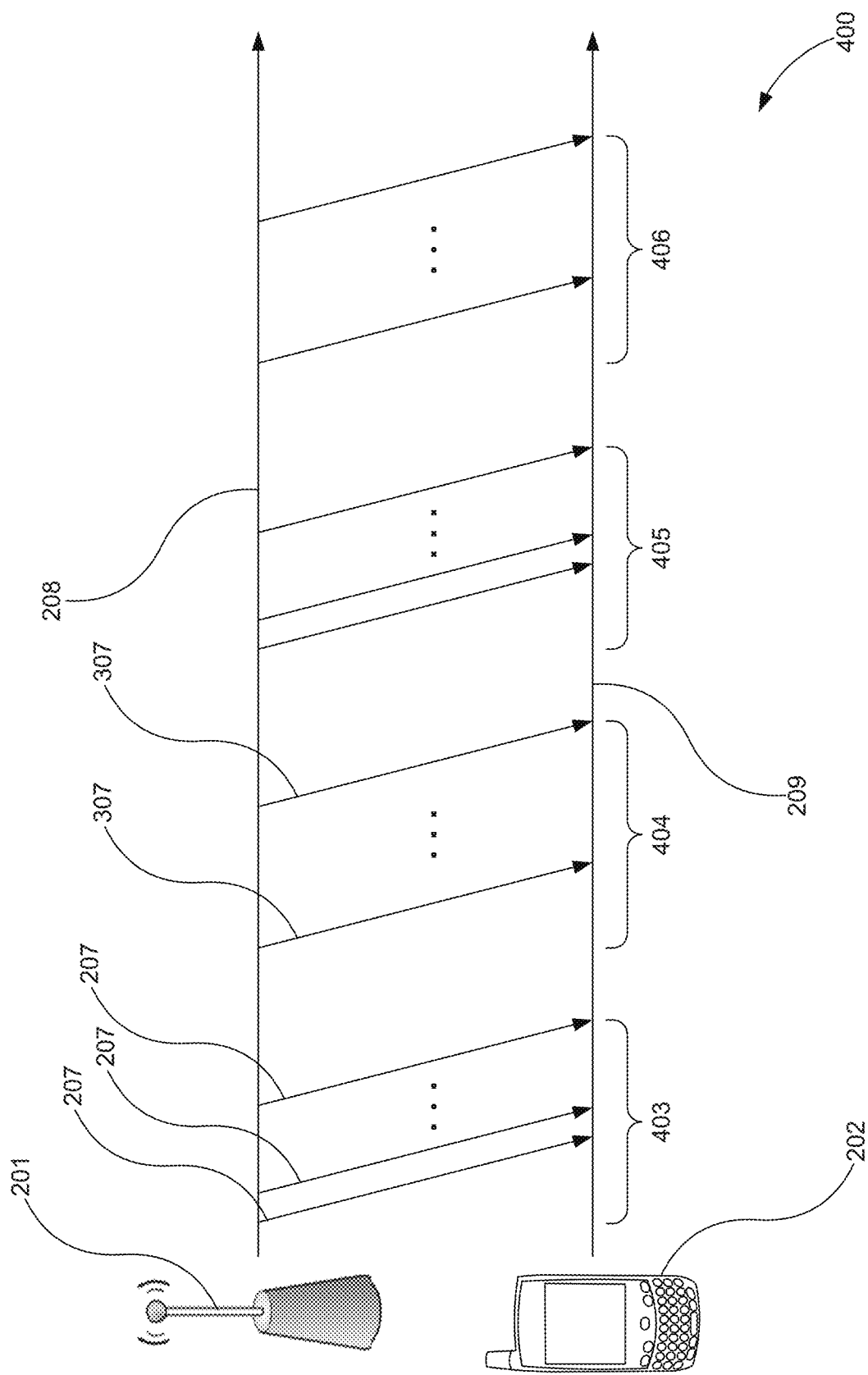
FIG. 4 is a diagram of a timeline of probe packets sent under a time-of-flight (ToF)-based distance estimation process and an energy of direct path (EDP)-based distance estimation process, according to one example of the principles described herein.

FIG. 4 is a diagram of a timeline of probe packets sent under a time-of-flight (ToF)-based distance estimation process and an energy of direct path (EDP)-based distance estimation process, according to one example of the principles described herein. The scalable distance estimation process uses an EDP-based distance estimation process with an accurate adjustment of path loss exponent $\gamma$ obtained from a ToF-based distance estimation process as shown in FIG. 4. By comparison between FIG. 2 and FIG. 4, the method of FIG. 4 is more scalable than the ToF-based distance estimation process.

Figure 5:
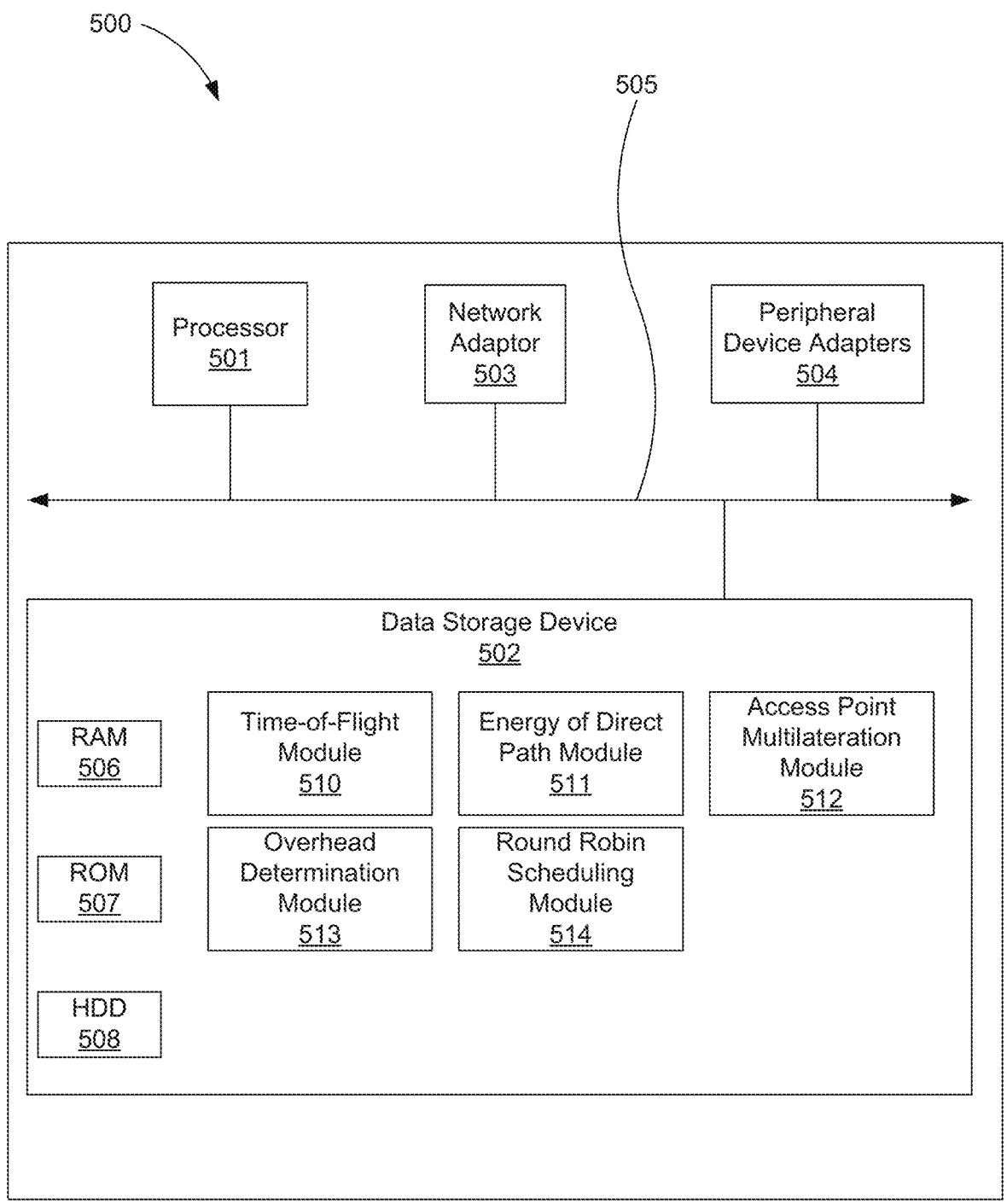
FIG. 5 is a diagram of an access point (AP), according to one example of the principles described herein.

FIG. 5 is a diagram of an access point (AP), according to one example of the principles described herein. As described above, any number of APs (110, 111, 112, 113, 114, 201) may be present within the localization system (100). Therefore, the description of the AP (500) applies to any number of the APs (110, 111, 112, 113, 114, 201) within the localization system (100). The AP (500) may be implemented in an electronic device. The AP (500) may be any electronic computing device that allows the mobile devices (101, 102, 103, 202) to connect to a wired network using, for example, Wi-Fi, or related standards. Examples of APs (500) include standalone electronic devices to connect the mobile devices (101, 102, 103, 202) to a router, routers, wireless routers, industrial access points, and industrial wireless access points, among other electronic devices.

The AP (500) may be utilized in any data processing scenario including, stand-alone hardware, mobile applications, through a computing network, or combinations thereof. Further, the AP (500) may be used in a computing network, a public cloud network, a private cloud network, a hybrid cloud network, other forms of networks, or combinations thereof. In one example, the methods provided by the AP (500) are provided as a service over a network by, for example, a third party. In this example, the service may comprise, for example, the following: a Software as a Service (SaaS) hosting applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the AP (500) are executed by a local administrator.

To achieve its desired functionality, the AP (500) comprises various hardware components. Among these hardware components may be processors (501), data storage devices (502), network adapters (503), and peripheral device adapters (504). These hardware components may be interconnected through the use of busses and/or network connections. In one example, the processor (501), data storage device (502), network adapter (503), and peripheral device adapter (504) may be communicatively coupled via a bus (505).

The processor (501) may include the hardware architecture to retrieve executable code from the data storage device (502) and execute the executable code. The executable code may, when executed by the processor (501), cause the processor (501) to implement at least the functionality of connecting the mobile devices (101, 102, 103, 202) to a computing network, determining the location of the mobile devices (101, 102, 103, 202), determining the distance between the mobile devices (101, 102, 103, 202) and the AP (500), other functionality, or combinations thereof according to the methods of the present specification described herein. In the course of executing code, the processor (501) may receive input from and provide output to the remaining hardware units internal and external to the AP (500).

The data storage device (502) may store data such as executable program code that is executed by the processor (501) or other processing device. As will be discussed, the data storage device (502) may specifically store computer code representing applications that the processor (501) executes to implement at least the functionality described herein.

The data storage device (502) may include various types of memory modules, including volatile and nonvolatile memory. For example, the data storage device (502) of the present example includes Random Access Memory (RAM) (506), Read Only Memory (ROM) (507), and Hard Disk Drive (HDD) memory (508). Many other types of memory may also be utilized, and the present specification contemplates the use of many varying type(s) of memory in the data storage device (502) as may suit a particular application of the principles described herein. In certain examples, different types of memory in the data storage device (502) may be used for different data storage needs. For example, in certain examples the processor (501) may boot from Read Only Memory (ROM) (507), maintain nonvolatile storage in the Hard Disk Drive (HDD) memory (508), and execute program code stored in Random Access Memory (RAM) (506).

Generally, the data storage device (502) may comprise a computer readable medium, a computer readable storage medium, or a non-transitory computer readable medium, among others. For example, the data storage device (502) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (503, 504) in the AP (500) enable the processor (501) to interface with various other hardware elements, external and internal to the AP (500). For example, the peripheral device adapters (503) may provide an interface to input/output devices, such as, for example, display device, a mouse, or a keyboard connected directly to the AP (500) or through another external device such as a router, server, or other computing device. The peripheral device adapters (503) may also provide access to other external devices such as an external storage device, network devices such as, for example, servers, switches, and routers, client devices, other types of computing devices, and combinations thereof.

The network adapter (504) may provide an interface to other computing devices within, for example, a network, thereby enabling the transmission of data between the AP (500) and other devices located within the network.

The AP (500) further comprises modules used in the implementation of connecting the mobile devices (101, 102, 103, 202) to a computing network, determining the location of the mobile devices (101, 102, 103, 202), determining the distance between the mobile devices (101, 102, 103, 202) and the AP (500), other functionality, or combinations thereof according to the methods of the present specification described herein. The various modules within the AP (500) comprise executable program code that may be executed separately. In this example, the various modules may be stored as separate computer program products. In another example, the various modules within the AP (500) may be combined within computer program products; each computer program product comprising the modules.

The AP (500) may include a time-of-flight (ToF) module (510) to, when executed by the processor (501), perform calculations associated with the above-described ToF-based distance estimation process. The ToF module (510) sends probe packets to a mobile device (101, 102, 103, 202), receives ACK packets from the mobile device (101, 102, 103, 202), determines a distance between the mobile device (101, 102, 103, 202) and the AP (110, 111, 112, 113, 114, 201), and, through coordination with other APs (110, 111, 112, 113, 114, 201), determines the location of the mobile device (101, 102, 103, 202) within an area. The ToF module (510) may perform these functions in connection with any number of mobile devices (101, 102, 103, 202) in serial, in parallel, or combinations thereof.

The AP (500) may include an energy of direct path (EDP) module (511) to, when executed by the processor (501), perform calculations associated with the above-described EDP-based distance estimation process. The EDP module (511) sends probe packets to a mobile device (101, 102, 103, 202), receives ACK packets from the mobile device (101, 102, 103, 202), determines a distance between the mobile device (101, 102, 103, 202) and the AP (110, 111, 112, 113, 114, 201), and, through coordination with other APs (110, 111, 112, 113, 114, 201), determines the location of the mobile device (101, 102, 103, 202) within an area. The EDP module (511) may perform these functions in connection with any number of mobile devices (101, 102, 103, 202) in serial, in parallel, or combinations thereof.

The AP (500) may include an access point multilateration module (512) to, when executed by the processor (501), coordinate with the APs (110, 111, 112, 113, 114, 201) within the localization system (100) to determine the location of the mobile devices (101, 102, 103, 202) within an area using the output of the ToF module (510) and EDP module (511). Lines 140, 141, and 142 of FIG. 1 designate communications that may occur between APs (110, 111, 112, 113, 114, 201) within the localization system (100) during execution of the access point multilateration module (512) to coordinate with the APs (110, 111, 112, 113, 114, 201) to determine the location of the mobile devices (101, 102, 103, 202).

The AP (500) may include an overhead determination module (513) to, when executed by the processor (501), determine the overhead of the probe packets sent to mobile devices (101, 102, 103, 202). The AP (500) may include a round robin scheduling module (514) to, when executed by the processor (501), schedule, according to a round robin scheduling algorithm, the determination of a location of the mobile devices (101, 102, 103, 202) based on the overhead determined by the overhead determination module (513).

Figure 6:
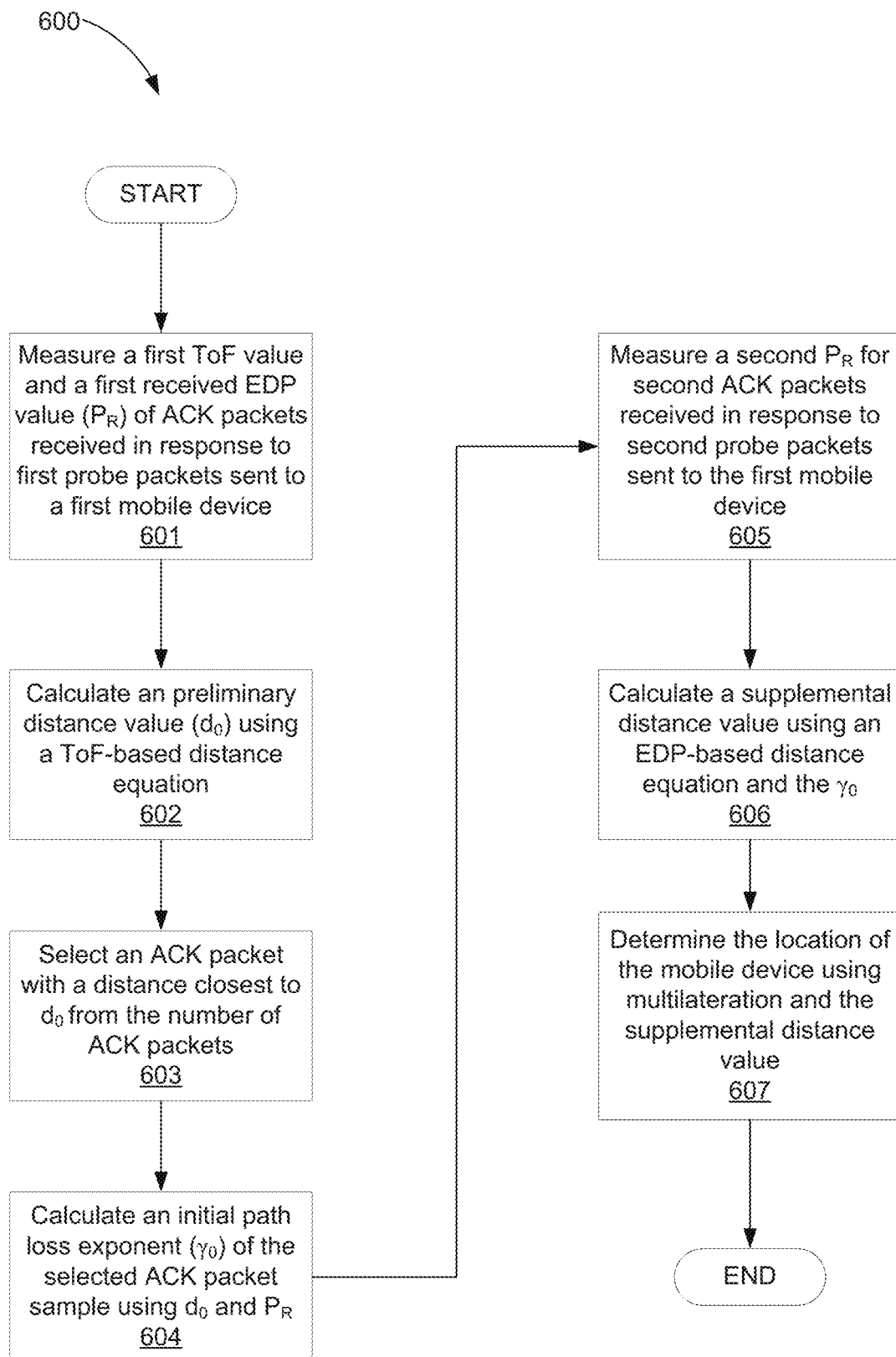
FIG. 6 is a flowchart showing a method of determining the location of a mobile computing device, according to one example of the principles described herein.

FIG. 4 will now be described in more detail in connection with FIGS. 5 and 6. FIG. 6 is a flowchart showing a method (500) of determining the location of a mobile computing device (101, 102, 103, 202), according to one example of the principles described herein. The method (600) of FIG. 6 may begin by measuring (block 601) a first time of flight (ToF) value and a first value of received energy of direct path (EDP) ($P_R$) of acknowledgement (ACK) packets received in response to the first probe packets sent to a first mobile device with the ToF module (510) and the EDP module (511), respectively. When an AP (110, 111, 112, 113, 114, 201) attempts to estimate a distance for a mobile device (101, 102, 103, 202), the AP (110, 111, 112, 113, 114, 201) transmits the probe packets (207) to the mobile device (101, 102, 103, 202) as described above in connection with the ToF-based distance estimation process of FIG. 2. In one example, the AP (110, 111, 112, 113, 114, 201) transmits 100 probe packets (207) to the mobile device (101, 102, 103, 202). In one example, the measured values obtained by the AP (110, 111, 112, 113, 114, 201) of the ToF and EDP-based distance estimation processes are stored in memory such as the data storage device (502) of the AP (110, 111, 112, 113, 114, 201).

The method includes calculating (block 602), with the ToF module (510), a preliminary distance value ($d_0$) using a ToF-based distance equation determined by the ToF module (510). The ToF-based distance is determined using the processes and equations described above in connection with the ToF-based distance estimation process of FIG. 2.

The method further includes selecting (block 603), with the ToF module (510), an ACK packet with a distance closest to $d_0$ from the ACK packets. At block 603, the ToF module (510) of the AP (110, 111, 112, 113, 114, 201) determines the median of ToF measurements as the $d_0$ value.

With $d_0$ and EDP $P_R$ determined at block 601 of the chosen ACK packet, an initial path loss exponent, $\gamma_0$, may be calculated (block 604) using Equation 3, above by executing the EDP module (511). In one example, the processes described above in connection with blocks 601 through 604 may be designated as an initial phase. The next phase described hereafter may be referred to as the secondary phase, and includes the processes associated with blocks 605 through 607.

The method (600) of FIG. 6 may further include measuring (block 605) a second $P_R$ for a second set of ACK packets received in response to a set of second probe packets (307)

sent to the mobile device (101, 102, 103, 202) with the EDP module (511). At block 605, the AP (110, 111, 112, 113, 114, 201) measures EDP for each of the second ACK packets, and estimates the distance by Eq. 3 using $\gamma_0$ obtained from the initial phase (blocks 601-604). Use of the $\gamma_0$ value obtained from the initial phase maintains accuracy of the algorithms and processes described herein. As discussed above, some EDP-based estimation processes use EDP/RSSI to obtain a path loss exponent. Instead of using the inaccurate EDP/RSSI values, this secondary EDP phase uses the path loss exponent estimated from the more accurate ToF-based distance estimation processes described above. As to the probe packets sent during the execution of the EDP-based distance estimation process, in one example, the probe packets sent may be less than the probe packets sent at block 601. In another example, the probe packets sent in this secondary EDP phase may be one (1). In another example, the probe packets sent in this secondary EDP phase may be adjustable according to an overhead requirement or application scenario.

The method may proceed by calculating (block 606), with the EDP module (511), a supplemental distance value using an EDP-based distance equation and the $\gamma_0$ value. The AP (110, 111, 112, 113, 114, 201), in conjunction with additional APs (110, 111, 112, 113, 114, 201) within the localization system (100) and with the access point multilateration module (512), determines (block 607) the location of the mobile device (101, 102, 103, 202) using multilateration and the supplemental distance value calculated at block 606. Lines 140, 141, and 142 of FIG. 1 designate communications that may occur between APs (110, 111, 112, 113, 114, 201) within the localization system (100) during execution of the access point multilateration module (512) to coordinate with the APs (110, 111, 112, 113, 114, 201) to determine the location of the mobile devices (101, 102, 103, 202). More details regarding determination of the location of a mobile computing device within an area will now be described in connection with FIG. 7.

Figure 7:
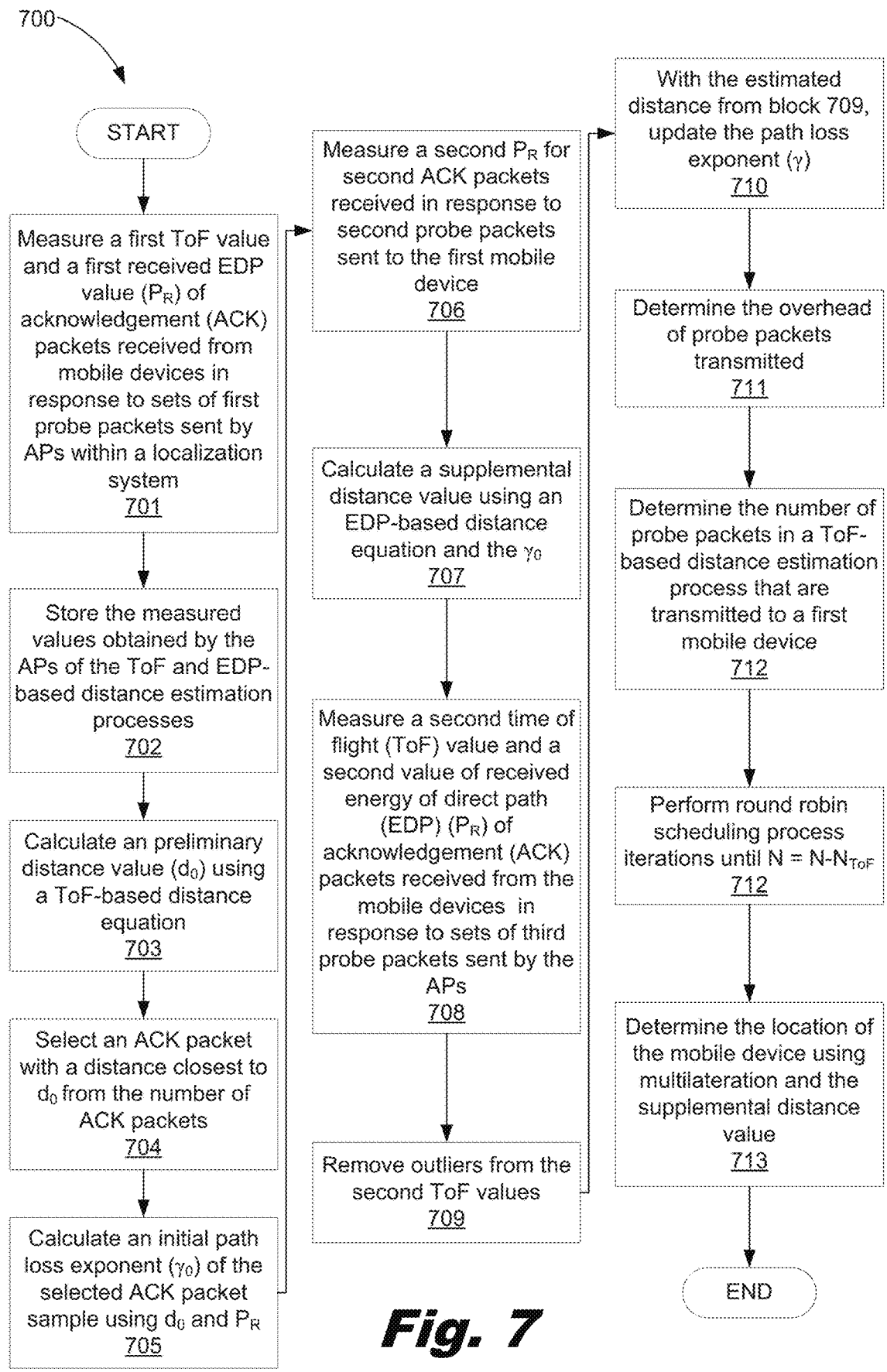
FIG. 7 is a flowchart showing a method of determining the location of a mobile computing device, according to another example of the principles described herein.

FIG. 7 is a flowchart showing a method of determining the location of a mobile computing device, according to another example of the principles described herein. The method (700) of FIG. 7 may begin by measuring (block 701) a first time of flight (ToF) value and a first value of received energy of direct path (EDP) ($P_R$) of acknowledgement (ACK) packets received from the mobile devices (101, 102, 103, 202) in response to sets of first probe packets sent by the APs (110, 111, 112, 113, 114, 201) within a localization system (100). Thus, the APs (110, 111, 112, 113, 114, 201) each send first probe packets (207) with the ToF module (510) and the EDP module (511) to the mobile devices (101, 102, 103, 202). In one example, each AP (110, 111, 112, 113, 114, 201) transmits 100 probe packets (207) to the mobile devices (101, 102, 103, 202). The measured values obtained by the APs (110, 111, 112, 113, 114, 201) of the ToF and EDP-based distance estimation processes are stored (block 702) by the processor (501) in memory such as the data storage device (502) of the AP (110, 111, 112, 113, 114, 201).

The method of FIG. 7 may further include calculating (block 703) a preliminary distance value ($d_0$) using a ToF-based distance equation determined by the ToF module (510). The preliminary distance value is measured with respect to each mobile device (101, 102, 103, 202). The ToF-based distance is determined using the processes and equations described above in connection with the ToF-based distance estimation process of FIG. 2.

The method further includes selecting (block 704), with the ToF module (510), an ACK packet with a distance closest to $d_0$ from the ACK packets. The process of block 704 is performed by the APs (110, 111, 112, 113, 114, 201) for each group of ACK packets sent by each of the individual mobile devices (101, 102, 103, 202) to obtain an ACK packet with a distance closest to $d_0$ from the ACK packets sent from each individual mobile devices (101, 102, 103, 202). At block 704, the ToF module (510) of the AP (110, 111, 112, 113, 114, 201) determines the median of ToF measurements as the $d_0$ value.

With $d_0$ and EDP $P_R$ determined at block 701 of each of the chosen ACK packets, an initial path loss exponent, $\gamma_0$, may be calculated (block 705) using Equation 3, above and executing the EDP module (511). In one example, the processes described above in connection with blocks 701 through 705 may be designated as an initial phase. The next phase described hereafter may be referred to as the secondary phase, and includes the processes associated with block 706.

The method (700) of FIG. 7 may further include measuring (block 706) a second $P_R$ for a second ACK packets received in response to second probe packets (703) sent to the mobile devices (101, 102, 103, 202) with the EDP module (511). At block 706, the APs (110, 111, 112, 113, 114, 201) measure EDP for each of the second ACK packets, and estimate the distance by Eq. 3 using $\gamma_0$ obtained from the initial phase (blocks 701-705). Use of the $\gamma_0$ value obtained from the initial phase maintains accuracy of the algorithms and processes described herein. As to the number of probe packets sent during the execution of the EDP-based distance estimation process, in one example, the number of probe packets sent may be less than the number of probe packets sent at block 701. In another example, the number of probe packets sent in this secondary EDP phase may be one (1). In another example, the number of probe packets sent in this secondary EDP phase may be adjustable according to an overhead requirement or application scenario.

The method (700) of FIG. 7 may proceed by calculating (block 707), with the EDP module (511), a supplemental distance value using an EDP-based distance equation and the $\gamma_0$ value. This supplemental distance value is calculated (block 707) for each mobile device (101, 102, 103, 202) the APs (110, 111, 112, 113, 114, 201) are seeking to locate.

After the secondary EDP phase, the method (700) of FIG. 7 may continue by measuring (block 708) a second time of flight (ToF) value and a second value of received energy of direct path (EDP) ($P_R$) of the acknowledgement (ACK) packets received from the mobile devices (101, 102, 103, 202) in response to sets of third probe packets (207) sent by the APs (110, 111, 112, 113, 114, 201) within a localization system (100). At this ToF phase at block 708, a given AP (110, 111, 112, 113, 114, 201) sends a fewer number of probe packets (207) than those sent in the first ToF-based distance estimation performed at block 701. In one example, ten (10) probe packets (207) are sent from a given AP (110, 111, 112, 113, 114, 201).

Outliers within the second time of flight (ToF) values measured at block 708 are removed (block 709) or disregarded using. In one example, a propagation delay is estimated from the values obtained from the EDP-based distance estimation process of block 708, and the APs (110, 111, 112, 113, 114, 201), executing the ToF module (510), remove outliers and estimate distances between the APs (110, 111, 112, 113, 114, 201) and the mobile devices (101, 102, 103, 202) by calculating the median of valid ToF measurements. In the electromagnetism field, the propagation delay is the length of time it takes for a signal to travel to its destination. For example, in the case of the probe packets (207), it is the time taken for the probe packets (207) to travel through the media between the APs (110, 111, 112, 113, 114, 201) and the mobile devices (101, 102, 103, 202).

The APs (110, 111, 112, 113, 114, 201) update (block 710) the path loss exponent (γ) of Equation 3. The APs (110, 111, 112, 113, 114, 201) use the newly updated path loss exponent (γ) in subsequent EDP-based distance estimation process. This updating (block 710) of path loss exponent is performed in order to ensure that different environments that have different path loss exponents are taken into account throughout the processes described herein.

As described in connection with the method (600) of FIG. 6, probe packets (207, 307) may be sent to one mobile device (101, 102, 103, 202) from an AP (110, 111, 112, 113, 114, 201). When an AP (110, 111, 112, 113, 114, 201) sends probe packets (207, 307) to multiple mobile devices (101, 102, 103, 202), the APs (110, 111, 112, 113, 114, 201) decide how many probe packets (207, 307) to send to each mobile device (101, 102, 103, 202) in a given time period. As will now be described, scheduling of probe packets (207, 307) for the mobile devices (101, 102, 103, 202) is performed by the overhead determination module (513) and the round robin scheduling module (514). In one example, the scheduling of the transmission of probe packets (207, 307) to each mobile device (101, 102, 103, 202) within the localization system (100) is performed regularly for all mobile devices (101, 102, 103, 202) for which a given AP (110, 111, 112, 113, 114, 201) is responsible. One advantage of this scheduling ToF-based distance estimation processes and EDP-based distance estimation processes are fairly performed for all mobile devices.

The method (700) of FIG. 7 thus further includes, with the overhead determination module (513), determining (block 711) the overhead of probe packets (207, 307) transmitted. An AP (110, 111, 112, 113, 114, 201) calculates overhead (OH) as a given input. Overhead represents the time fraction that probe packets (207, 307) may be transmitted per second. An administrator may set overhead as real number from 0 to 1, for example. Given an overhead as input, the probe packets (207, 307) (N) an AP (110, 111, 112, 113, 114, 201) may send per second may be calculated using the following equation:

$$N * t_{probe_{ack}} = OH \qquad \text{Eq. 4}$$

where $t_{probe\_ack}$ represents the time duration from the start of transmission of a probe packet (207, 307) to the end of reception of a corresponding ACK packet.

The method (700) of FIG. 7 continues by determining (block 712), with the round robin scheduling module (514), the probe packets (207) in a ToF-based distance estimation process that are transmitted to a first mobile device (101, 102, 103, 202). The probe packets (207) in a ToF-based distance estimation process that are sent to a first mobile device (101, 102, 103, 202) may be denoted as $N_{ToF}$.

To maintain fairness between mobile devices (101, 102, 103, 202), the round robin scheduling module (514) of the AP (110, 111, 112, 113, 114, 201) performs round robin process iterations until the number of probe packets is equal to the number of probe packets minus the number of probe packets for the ToF-based distance estimation process as follows:

$$N = N - N_{ToF} \qquad \text{Eq. 5}$$

Figure 8:
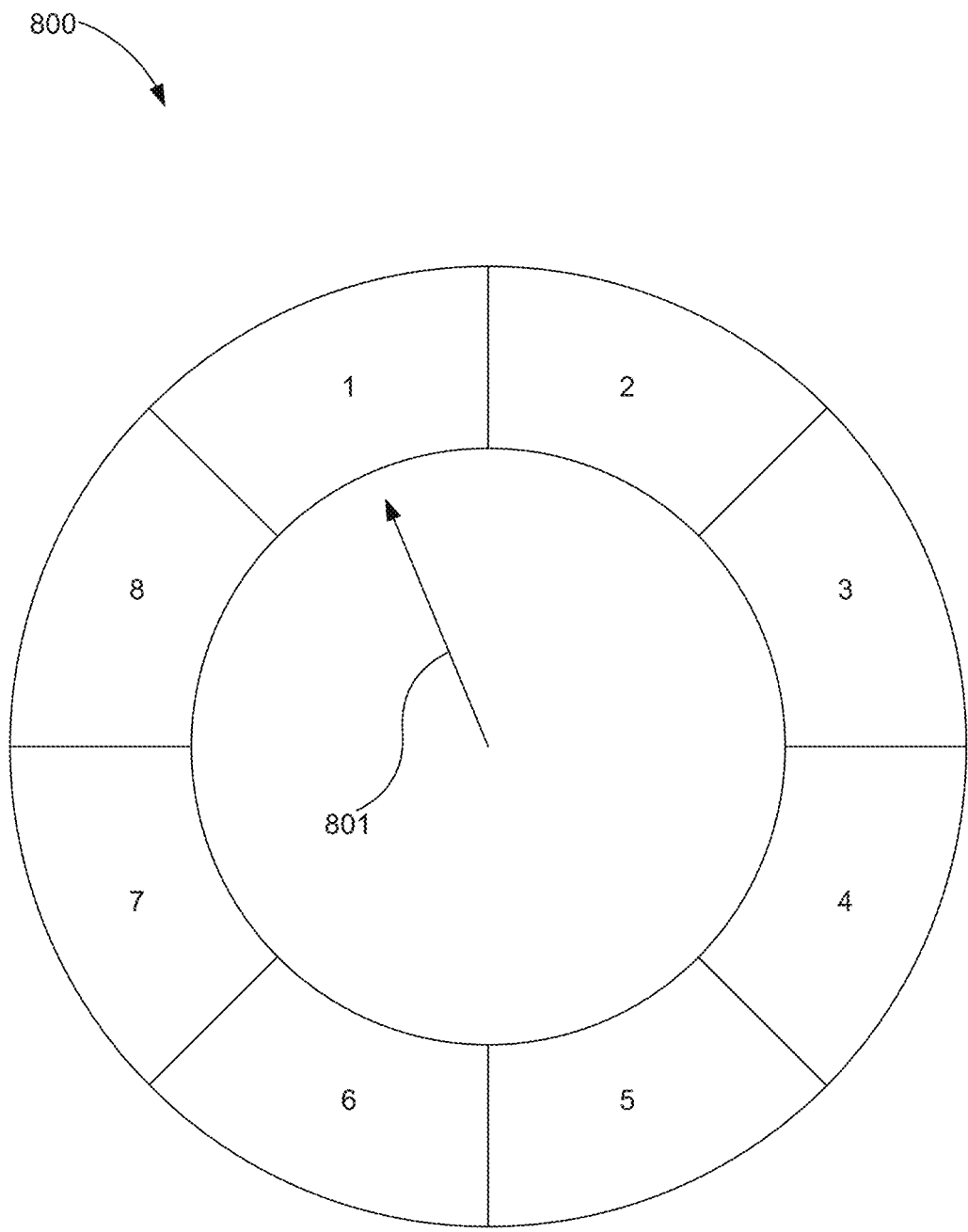
FIG. 8 is a diagram of a ring data structure for use in a round robin process, according to another example of the principles described herein.

This may be understood with reference to FIG. 8. FIG. 8 is a diagram of a ring data structure (800) for use in a round robin process, according to another example of the principles described herein. The ring data structure (800) identifies a representation of the mobile devices (101, 102, 103, 202) designed by numbers 1, 2, 3, 4, 5, 6, 7, and 8, respectively. Although only eight (8) mobile devices (101, 102, 103, 202) are represented in the ring data structure (800) of FIG. 8, any number of mobile devices may be included in the round robin process. The ring data structure (800) identifies a mobile device (101, 102, 103, 202) to which probe packets (207) are being sent via the pointer (801). The pointer (801) initially points to the first device designated as 1. The round robin scheduling module (514) performs iterations until Equation 5 is satisfied. In this manner, the robin scheduling module (514) of each of the APs (110, 111, 112, 113, 114, 201) are able to provide ToF-based distance estimation processes to the mobile devices (101, 102, 103, 202) in a first iteration according to allowable overhead (OH), perform EDP-based distance estimation processes for the remainder of the mobile devices (101, 102, 103, 202) during the first iteration, but eventually provide ToF-based distance estimation processes to all the mobile devices (101, 102, 103, 202) in a round robin manner. For example, in the first iteration of the execution of the robin scheduling module (514), mobile devices (101, 102, 103, 202) designated by numbers 1 and 2 may be provided a ToF-based distance estimation process while maintaining the number of probe packets (207) under the overhead (OH). The remaining mobile devices (101, 102, 103, 202) designated by numbers 3, 4, 5, 6, 7, and 8 are provided with an EDP-based distance estimation process. In a subsequent iteration of the execution of the robin scheduling module (514), mobile devices (101, 102, 103, 202) designated by numbers 3 and 4 may be provided a ToF-based distance estimation process while maintaining the number of probe packets (207) under the overhead (OH), and mobile devices (101, 102, 103, 202) designated by numbers 5, 6, 7, 8, 1, and 2 are provided with an EDP-based distance estimation process. All of these iterations are performed in accordance with blocks 601 through 606 of FIG. 6 and blocks 701 through 710 of FIG. 7.

The APs (110, 111, 112, 113, 114, 201) within the localization system (100) and with the access point multilateration module (512), determine (block 713) the location of the mobile devices (101, 102, 103, 202) using multilateration and the values calculated at blocks 701 through 712. The APs AP (110, 111, 112, 113, 114, 201, 500), with their respective access point multilateration modules (512) executed by the processor (501), coordinate with each other to determine the location of the mobile devices (101, 102, 103, 202) within the indoor environment (150) using the output of the ToF module (510) and EDP module (511), the overhead determination module (513), and the round robin scheduling module (514).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processors (501) of the access points (500) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe methods, systems, and computer program products for determining the location of a mobile computing device includes measuring a first time of flight (ToF) value and a first value of received energy of direct path (EDP) ($P_R$) of a number of acknowledgement (ACK) packets received in response to a number of first probe packets sent to a first mobile device. The method calculates a preliminary distance value ($d_0$) using a ToF-based distance equation, selects an ACK packet with a distance closest to $d_0$ from the number of ACK packets, calculates an initial path loss exponent ($\gamma_0$) of the selected ACK packet sample using $d_0$ and $P_R$. With the access point, the method also includes measuring a second $P_R$ for a second number of ACK packets received in response to a number of second probe packets sent to the first mobile device, calculates a supplemental distance value using an EDP-based distance equation and the $\gamma_0$, and determines the location of the mobile device using multilateration and the supplemental distance value These methods, systems, and computer program products for determining the location of a mobile computing device may have a number of advantages, including providing more accurate localization of the mobile computing device with a decrease in overhead in computational resources.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of determining the location of a mobile computing device comprising:
    measuring a first time of flight (ToF) value and a first value of received energy of direct path (EDP) ($P_R$) of acknowledgement (ACK) packets received in response to first probe packets sent to a first mobile device;
    calculating a preliminary distance value ($d_0$) using a ToF-based distance equation;
    selecting an ACK packet with a distance closest to $d_0$ from the ACK packets;
    calculating an initial path loss exponent ($\gamma_0$) of the selected ACK packet sample using $d_0$ and $P_R$;
    with the access point, measuring a second $P_R$ for second ACK packets received in response to second probe packets sent to the first mobile device;
    calculating a supplemental distance value using an EDP-based distance equation and the $\gamma_0$; and
    determining the location of the mobile device using multilateration and the supplemental distance value.

2. The method of claim 1, in which ToF-based distance equation comprises:

$$ToF = (ToA - ToD - SIFS)/2$$

where ToA (time-of-arrival) is a time when the access point begins receiving the ACK packets, ToD (time-of-departure) is a time when the probe packets are transmitted, and SIFS is the short interframe space.

3. The method of claim 1, in which the EDP-based distance equation comprises:

$$P_R = P_0 - 10\gamma \log(d)$$

where $P_R$ is the value of received energy of direct path (EDP) at the access point, $P_0$ is an initial value of energy of direct path (EDP), $\gamma$ is a path loss exponent and d is the distance between the first mobile device and the access point.

4. The method of claim 1, in which the number of first probe packets comprises one hundred packets.

5. The method of claim 1, in which the number of second probe packets comprises one packet.

6. The method of claim 1, further comprising storing the time of flight (ToF) and an energy of direct path (EDP) measurements.

7. The method of claim 1, in which the area in which the method operates is an indoor area.

8. The method of claim 1, further comprising:
    measuring a second time of flight (ToF) value and a third $P_R$ of third acknowledgement (ACK) packets received in response to third probe packets being sent to the first mobile device;
    removing outlying ToF values using a propagation delay estimated from the EDP-based distance equation;
    calculating the supplemental distance using a median of valid ToF measurements;
    updating the initial path loss exponent ($\gamma_0$) using the EDP-based distance equation; and
    using the updated path loss exponent ($\gamma_0$) in a subsequent calculation using the EDP-based distance equation.

9. The method of claim 8, in which the number of third probe packets is less than the number of first probe packets.

10. The method of claim 8, in which the number of third probe packets is ten.

11. The method of claim 1, in which the method is performed for additional mobile devices in a round robin scheduling process, the number of mobile devices included with a given round being based on an overhead, the overhead representing a time fraction that probe packets can be transmitted per second.

12. The method of claim 1, in which determining the location of the mobile device using multilateration and the supplemental distance value comprises performing the method of claim 1 with respect to a plurality of access points and the first mobile device.

13. A computer program product for determining the location of a mobile device, the computer program product comprising:
    a non-transitory computer readable storage medium comprising computer usable program code embodied therewith, the computer usable program code comprising:
    computer usable program code to, when executed by a processor, calculate a preliminary distance value (d_o) based on a measured first time of flight (ToF) value and a first value or received energy of direct path (EDP) (PR) derived from first acknowledgement (ACK) packets;
    computer usable program code to, when executed by the processor, select an ACK packet with a distance closest to d_o;
    computer usable program code to, when executed by processor, calculate an initial path loss exponent (y_o) of the selected ACK packet sample using d_o and $P_R$;
    computer usable program code to, when executed by the processor, measure a second $P_R$ for a second ACK packets;
    computer usable program code to, when executed by the processor, calculate a supplemental distance value using an EDP-based distance equation and the y_o;

computer usable program code to, when executed by the processor, measure a second ToF value and a third $P_R$ of third ACK packets;

computer usable program code to, when executed by the processor, remove outlying ToF Values using a propagation delay estimated from an EDP-based distance estimation;

computer usable program code to, when executed by the processor, update the y_o based on the ToF values from which outliers were removed; and computer usable program code to, when executed by the processor, determine the location of the mobile device using multilateration and the supplemental distance value and updated y_o.

14. The computer program product of claim 13, further comprising:

computer usable program code to, when executed by the processor, determine an overhead of probe packets; and perform a plurality of iterations of a round robin scheduling process.

15. An access point, comprising:

a processor; and a memory, the memory comprising executable code that, when executed by the processor:

calculates a preliminary distance value (d_o) based on a measured first time of flight (ToF) value and a first value of received energy of direct path (EDP) ($P_R$) derived from first acknowledgement (ACK) packets;

selects an ACK packet with a distance closest to d_o;

calculates an initial path loss exponent (y_o) of the selected ACK packet sample using do and $P_R$;

measures a second Pa for second ACK packets;

calculates a supplemental distance value using an EDP-based distance equation and the y_o;

measures a second ToF value and a third $P_R$ of third ACK packets;

removes outlying ToF values using a propagation delay estimated from an EDP-based distance estimation;

updates the y_o based on the ToF values from which outliers were removed; and determine the location of the mobile device using multilateration and the supplemental distance value and updated y_o.

* * * * *